United States Patent [19]

Finzer et al.

[11] 4,304,347

[45] Dec. 8, 1981

[54] APPARATUS FOR FEEDING MATERIAL TO A METALWORKING MACHINE

[75] Inventors: Heinz Finzer; Wolfgang Kessler, both of Bad Säckingen, Fed. Rep. of Germany

[73] Assignee: Heinz Finzer AG, Bad Säckingen, Fed. Rep. of Germany

[21] Appl. No.: 97,521

[22] Filed: Nov. 26, 1979

[30] Foreign Application Priority Data

Nov. 28, 1978 [DE] Fed. Rep. of Germany ....... 2851475

[51] Int. Cl.³ .......................................... B65H 17/44
[52] U.S. Cl. .................................... 226/150; 226/162
[58] Field of Search ............................. 226/147–150, 226/162, 165

[56] References Cited

U.S. PATENT DOCUMENTS 3,814,299 6/1974 Spercel ................................. 226/162
3,937,379 2/1976 Narwid et al. ....................... 226/150
4,167,239 9/1979 Bihler ................................. 226/150

Primary Examiner—Leonard D. Christian
Attorney, Agent, or Firm—Jay L. Chaskin

[57] ABSTRACT

A feed apparatus for feeding material to a metalworking machine comprises two alternately operating gripping units; the first unit comprising a reciprocating transport gripper element which moves the material forward by steps; the second unit comprises a stationary non-return gripper element which retains the material during the return stroke of the transport gripper element. At least one of the elements can be operated in opposition to spring force by means of a pressure medium which can be displaced by a displacing means acting as an operating mechanism. At least one of the gripper elements is connected to a displacing means by a closed container which stores the pressure medium, the container having extensible wall sections to which the gripper element and the displacing means is connected.

16 Claims, 23 Drawing Figures

APPARATUS FOR FEEDING MATERIAL TO A METALWORKING MACHINE

The invention relates to a feed apparatus for feeding material to a metalworking machine, particularly wire or strip feeding to automatic punching and forming machines.

A known feed apparatus according to German Offenlegungsschrift No. 27 11 693 discloses a non-return gripping element and transport gripping element which are each designed as a piston/cylinder unit and alternately driven by a common piston/cylinder unit acting as a displacing means. It is not only costly to design the gripping elements and displacing means in this way. The moving pistons are also subject to wear; leakage is also possible and must be counteracted with a storage tank and a refilling valve. Moreover, the working surfaces of the pistons as well as the return springs in the piston/cylinder units and the pressure setting in the hydraulic medium must be synchronized with one another in a complicated manner so that the non-return gripping operation is reliably effected during the return stroke of the feed slide, and transport gripping during feed of the feed slide and the change in gripping action while the feed slide is stationary. There is the additional disadvantage that during longer periods of inaction—for example, overnight or over a weekend—pressure may be reduced due to leakage peculiar to a piston cylinder unit of the system to such an extent that irregular conditions for non-return and transport gripping occurs when the machine is switched on again. If this is the case, the operator must adopt additional measures before normal operation can be resumed, this being an additional source of trouble and error.

It is an object of the invention to develop a feed apparatus which eliminates the risk of leakage and the faults associated therewith and ensures a simple construction or arrangement.

In accordance with the invention a quantity of hydraulic medium is displaced within a closed container which can be completely sealed. In view of the fact that the container has substantially flexible wall sections only in the area of the displacing means and grippers, the volume displaced by the displacing means can perform work on the grippers which can be used either to release a gripping element or bring it into a gripping position. By using such a container the displacing means can be fitted in any desired constructionally advantageous position. There are no sliding parts and therefore no parts prone to wear inside the container, i.e. within the area covered by the hydraulic medium. No leakage can take place. Also, a control unit operated by means of valves and oil storage tanks, etc. is omitted.

A particularly simple embodiment is obtained if the container has a structure which is simple to manufacture and easy to remove or transfer. Such a container can consist of a plurality of closely connected parts, e.g. highly flexible hose components, bladders or bellows, serving as a flexible extending wall section, and also a low-expansion tube when subjected to pressure or a flexible hose.

If the end sections of the container in the embodiment serving as a hose are in the form of extensible for flexible wall sections, they can meander repeatedly in the actual working areas to obtain larger working surfaces as well as a greater volume displacement or they can even be expanded like a cushion.

It is particularly advantageous if each gripping element can be operated independently of the other, for example, overlapping between two gripping elements can be simply effected. Moreover, the non-return gripper element can be transferred into the release position for a short time during its gripping phase, which is necessary if e.g. the feed material is to be precisely positioned by pilot pins. In this connection the gripper can be set precisely and reproducibly. The thickness tolerances of the feed material are compensated by the springs.

The invention will be explained in more detail below with the aid of schematic drawings of several practical embodiments in which.

Figure 1:
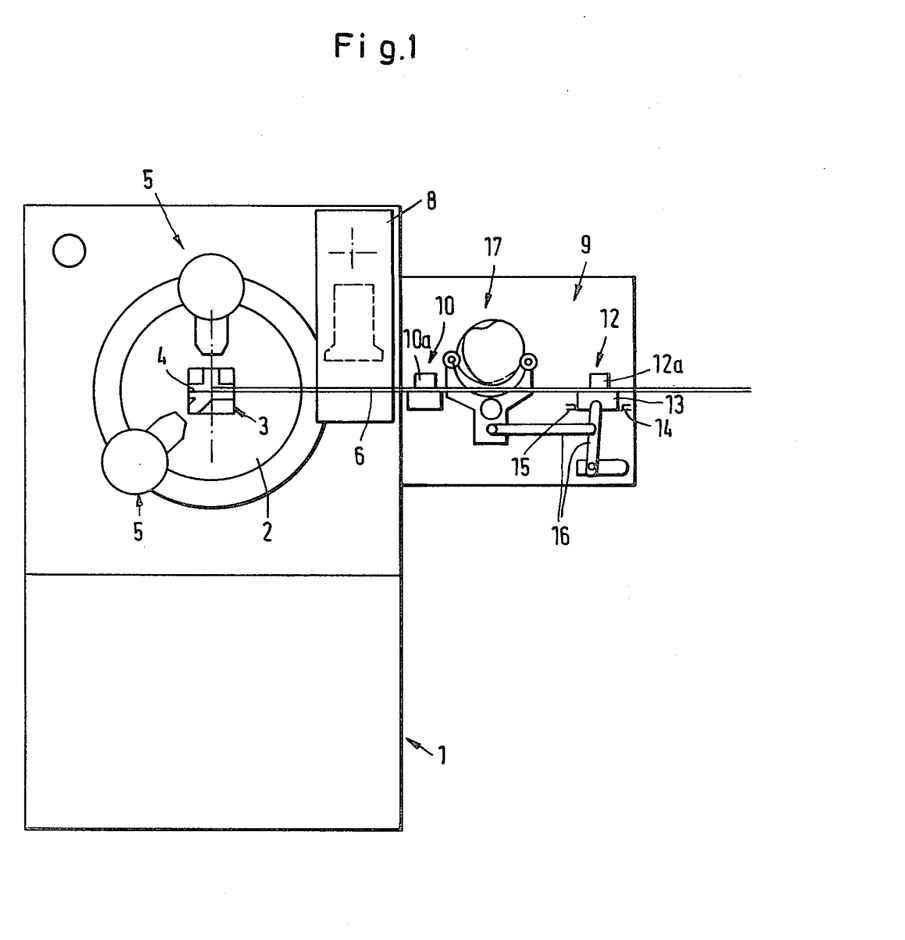
FIG. 1 shows, in elevation, an automatic punching and forming machine which is provided with a feed apparatus according to the invention comprising a gripping unit of two grippers and a displacing means acting as an operating mechanism.

FIG. 1 shows a metalworking machine in the form of an automatic punching and forming machine provided, in accordance with the invention, with a gripper for a feed apparatus. The automatic punching and forming machine comprises in a housing 1 a circular work table 2 with a central working station 3 which is a receiving plate 4 with U-shaped guides for tools (not shown), such as bending punches, shears or the like and to which the tools can be fed with the aid of tool slides 5 distributed around a circular work table in order to form or work a wire or a strip 6 which is prepared by means of a punch unit 8 and fed from the feed apparatus 9.

The feed apparatus 9 cooperates with a gripper comprising a gripping unit 10 with a stationary non-return gripping element 10a and a gripping unit 12 with a transport gripping element 12a connected to a feed slide 13 which can perform reciprocating movements between stops 14 and 15 and is driven by the drive 17 of the feed apparatus 9 via a system of connecting rods 16.

During one revolution of the drive 17 the feed slide 13 executes a single reciprocating movement between the stops 14 and 15, the transport gripper element 12a gripping the strip 6 when the right stop 14 is reached and moving it to the left during execution of the feed stroke when the direction of movement of the feed slide 13 is reversed. In this case the non-return gripper 10a is released. When the left stop 15 is reached, the non-return gripper 10a closes while the transport gripping element 12a opens for the return stroke.

Figures 2, 3:
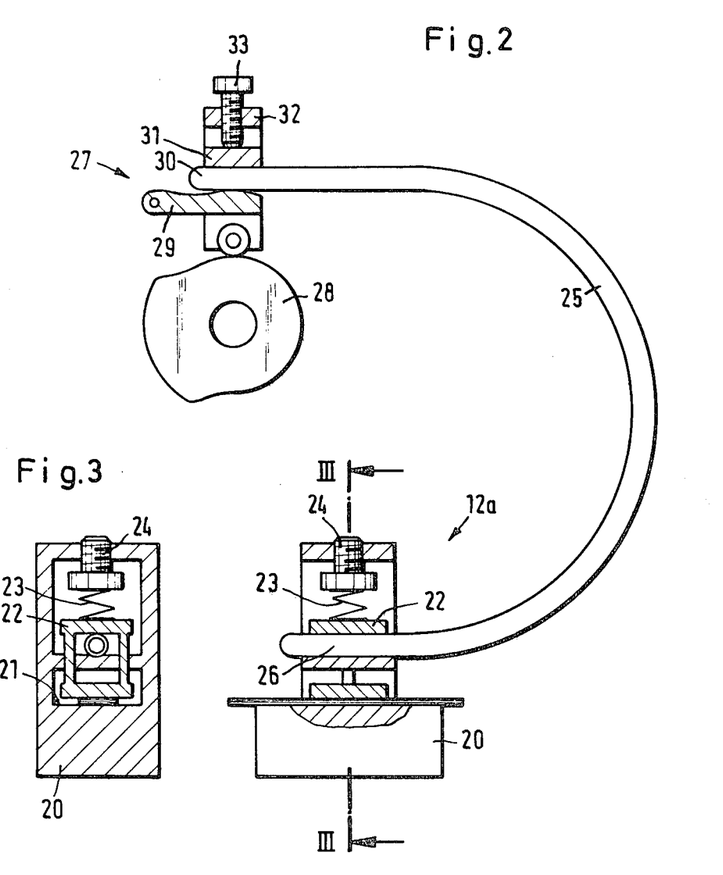
FIG. 2 shows, in partial section, a gripping unit according to the invention and the associated displacing means.
FIG. 3 is a section along the line III—III shown in FIG. 2.

The gripper unit shown in FIGS. 2 and 3, which can form both the unit 10a for non-return gripping and the unit 12a for transport gripping and which in this case is used e.g. for transport gripping, comprises the transport gripping element 12a having a housing 20 provided with a continuous surface 21 for the strip 6 to pass over. With the aid of a guided gripper plate 22 the strip 6 is pressed against the surface 21 under the tension of a compression spring 23 whose pretensioning can be adjusted by means of a set screw 24. In this case the housing 20 at the same time forms the feed slide 13. The gripping force of the spring can be terminated or neutralized with the aid of a pipe member 25 which contains an enclosed and preferably hydraulic pressure medium and has, in the area of the gripper plate 22, an extensible, flexible or e.g. bellows-like end section 26 which lifts the plate 22 clear of the strip 6 when the pressure of the hydraulic medium is exerted against the compression spring 23. The pressure medium is admitted with the aid of an actuating mechanism 27 in the form of a displacing means and, by way of a cam 28, presses a plunger or ram 29 against a second flexible, bellows-like or like end section 30 of the pipe member 25. This end section 30 is supported against a back-stop 31 which can be adjusted with the aid of a set screw 33 inside the housing 32.

The pipe member is preferably a non-elastic, flexible hose which can be deformed only at its end sections clamped in the housings 20 and 32 while the hydraulic medium contained therein is displaced, the said end sections comprising either flexibly deformable or even bellows-like wall sections. The hydraulic medium is fully enclosed so that there can be no trouble resulting from leakages. In view of the flexibility of the pipe member the transport element can be easily moved as the feed slide; secondly, the displacing means can also in this case be fitted in an optimum place since this pipe member can be guided to any desired point.

It goes without saying that the displacing means operates in coordination with the drive 17 of the feed apparatus 9. Moreover, it is obvious that the pipe member 25 does not need to be flexible in the case of the non-return gripper element 10a.

If a gripper unit as shown in FIG. 2 is used for each of the non-return gripper element 10a and transport gripper element 12a, their displacing means can be synchronized with one another so that the individual gripping elements are operated alternately.

Figure 4:
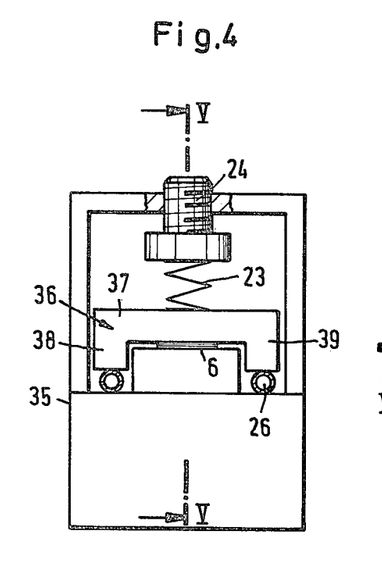
FIGS. 4, 5 and 6 show further embodiments of a gripping element according to the invention in, respectively, elevation (FIG. 4), vertical section (FIG. 5) along the line V—V shown in FIG. 4 and a horizontal section (FIG. 6) along the line VI—VI shown in FIG. 4.
Figure 5:
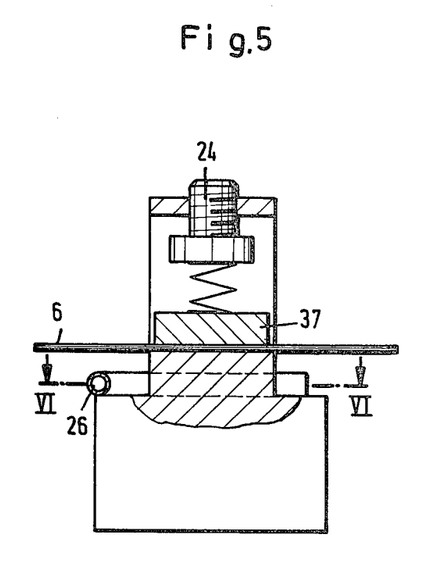
Figure 6:
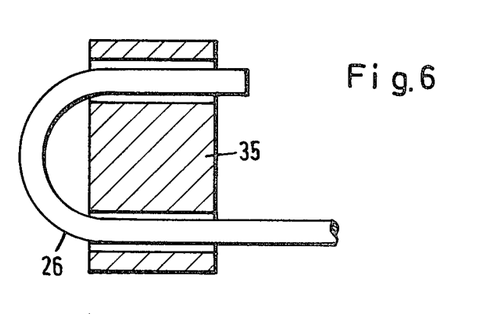

FIGS. 4 to 6 show a simplified housing 35 for the gripper unit shown in FIG. 2. In this case the gripper plate 36 is merely a U-shaped plate, the cross piece 37 of which acts against the strip 6 and the flanges 38 and 39 of which are subjected to pressure by the end section 26 of the pipe member 25. The end section 26 in this case is in the form of a U-shaped hose end in order to obtain a greater effective pressure area, as illustrated in FIG. 6.

The gripper unit shown in FIGS. 7 and 8, which again can also include the non-return gripper 10a or the transport gripper 12a, differs essentially from the unit in FIGS. 2 and 3 only in that the gripping force is applied to the strip 6 with the aid of the flexible or extensible end section 26 of the pipe member 25, whereas the spring acts in the direction in which this force is cancelled. The end section 26 of the pipe member 25 in this case bears against a rear plate 40, which can be adjusted by the set screw 24, and presses on the gripper plate 41 which presses it against the strip 6 in opposition to the force of two compression springs 42. The gripper housing 43 corresponds essentially to the housing 35 shown in FIG. 4. The associated displacing means 27 is practically the same as that shown in FIG. 2 and corresponding parts have been given the same reference numerals.

Figure 9:
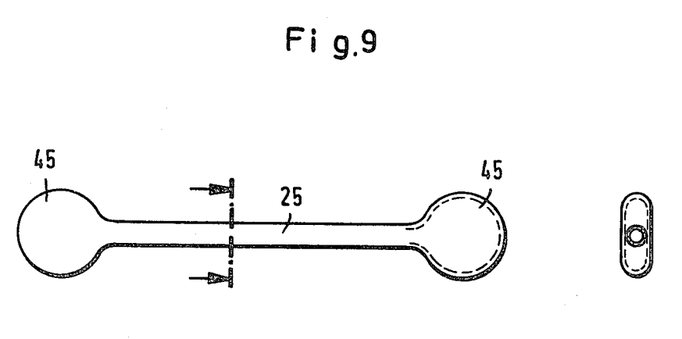
FIGS. 9 and 10 show, in elevation and section respectively, two further embodiments of a pipe member according to the invention for the gripping units shown in the preceding Figures.
Figure 10:
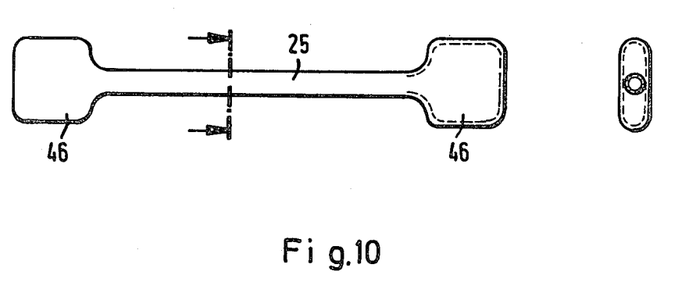

FIGS. 9 and 10 show embodiments of the pipe member 25 which is provided with extensible end sections 45 and 46 which expand like a cushion; these end sections give rise to greater surface areas of pressure and permit a greater displacement.

Figures 7, 8:
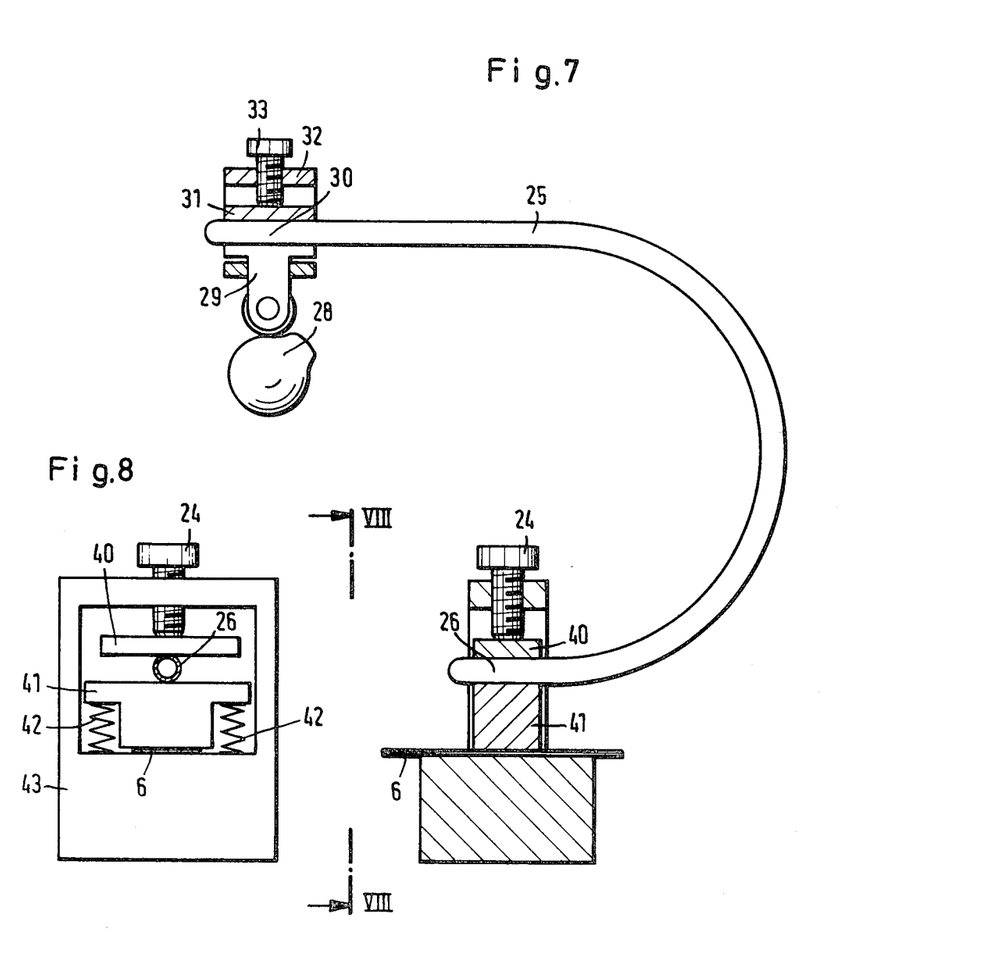
FIG. 7 shows, in a partial section corresponding to FIG. 2, a further embodiment of a gripping unit according to the invention together with the associated displacing means.
FIG. 8 is a view along the line VIII—VIII shown in FIG. 7.
Figure 11:
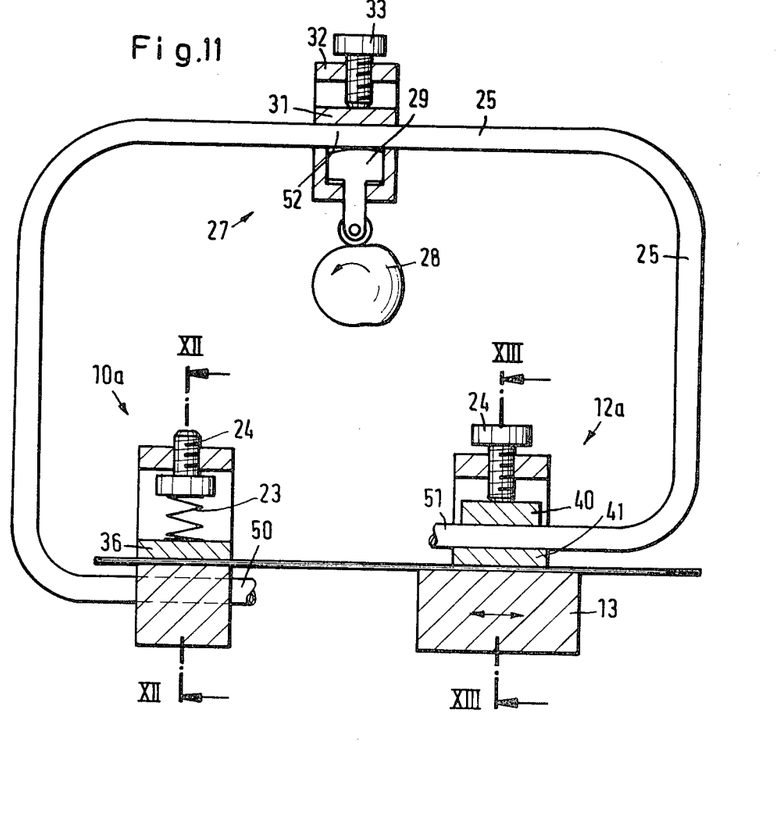
FIG. 11 shows, in partial section, a gripper according to the invention for the comon operation of two gripping units.
Figure 12:
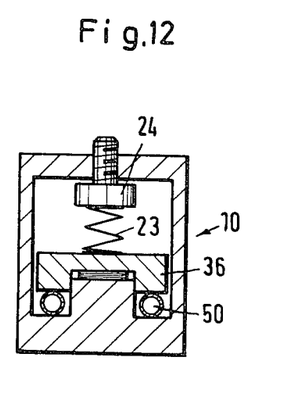
FIGS. 12 and 13 are sections along the lines XII—XII and XIII—XIII, respectively, shown in FIG. 11.
Figure 13:
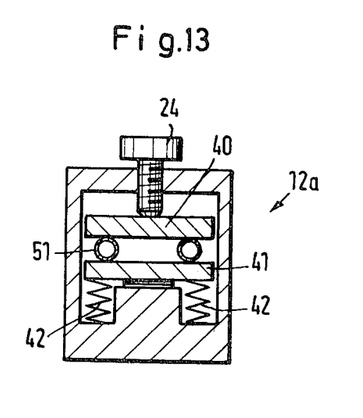
Figure 14:
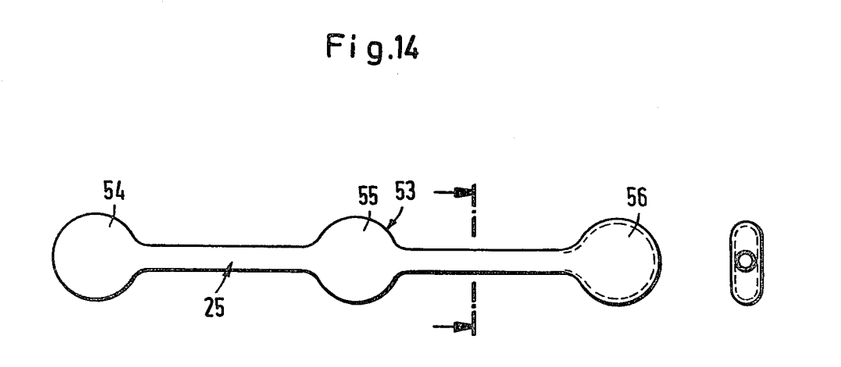
FIGS. 14 and 15 show, in elevation in section, a further embodiment of a pipe member for a gripping unit shown in FIG. 11.
Figure 15:
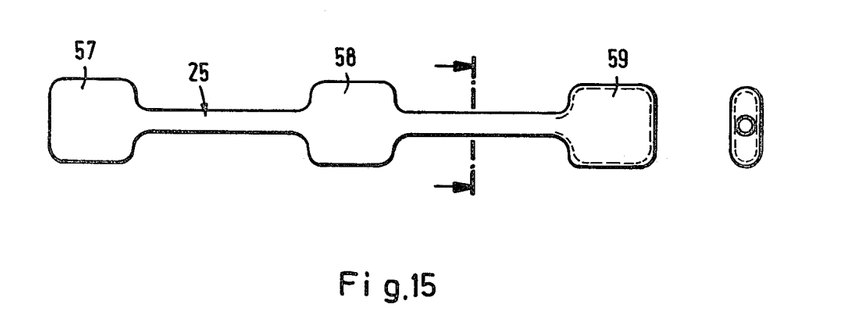

FIGS. 11 to 13 show how the two gripper units 10 and 12 can be operated by a common displacing means 27 which is identical in design to that shown in FIG. 7 and therefore has the same reference numerals.

In this case the pipe member 25 is clamped in the non-return gripper 10a by one end 50 and in the transport gripper element 12a by the other end 51 and accordingly has an extensible wall section on these two end sections; in addition, the pipe member comprises a second extensible wall section 52 in the working area of the displacing means 27, the pipe member again being preferably a flexible hose which, as in FIG. 6, is situated in two places inside the gripper elements 10a and 12a, as can be clearly seen in FIGS. 12 and 13, the gripping force in the case of the non-return gripper 10a being applied by the compression spring 23 and the relesing force by the end section 50 of the pipe member (see also FIG. 4) whereas in the case of the transport gripper 12a shown in FIG. 8 the gripping force is applied by the end section 51 of the pipe member 25 and the releasing force by the compression spring 42. The overlapping of the two gripper elements in this case is effected by synchronizing the pretensioning of the springs 23, 42 and the working surfaces of the end sections 50,51 as well as the volumetric displacement by back-stops 31 in such a way that the spring 23 has already moved the non-return gripper 10a into the gripping position before the transport gripper 12a opens, if the pressure drops in the pipe member 25 and therefore in the and sections 50 and 51 and that conversely, when pressure rises, the transport gripper is transferred into the gripping position by the end section 51 before the pressure in the end section 50 overcomes the pretensioning force of the spring 23 and therefore opens the non-return gripper.

Figure 16:
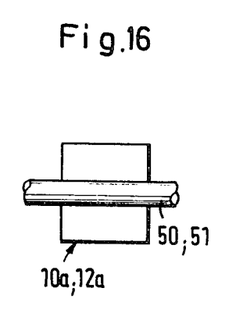
FIGS. 16 and 18 show, in elevation, three further embodiments of a pipe member for gripping units shown in the preceding Figures.
Figure 17:
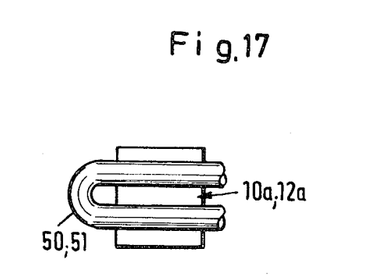
Figure 18:
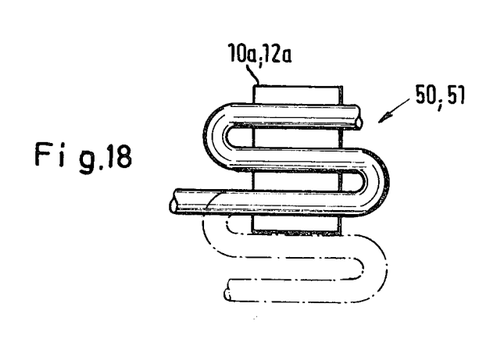

The pipe member 25 can extend through the displacing means 27 and the gripper elements 10a and 12a in one position or even in several juxtaposed positions, as can be seen from FIGS. 16 to 18; also, the pipe member can instead be provided with sections 54, 55, 56 or 57, 58, 59 expanding like cushions, the central one 55 or 58 of each being provided in the displacing means 27.

Figure 19:
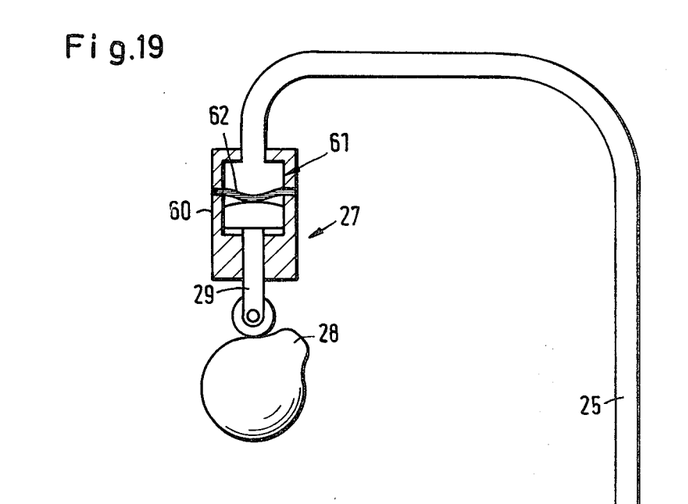
FIG. 19 shows, in a view corresponding to FIG. 2, a further embodiment of a gripping unit according to the invention and the associated displacing means.
Figure 20:
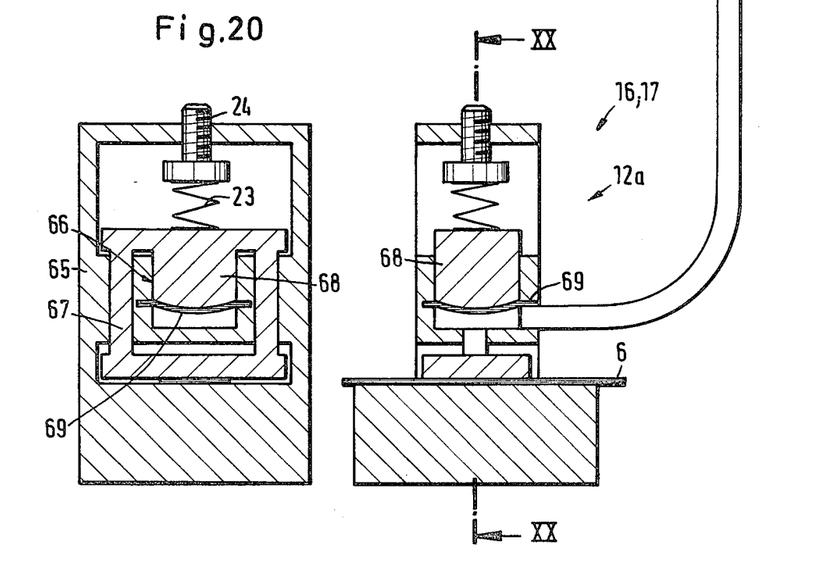
FIG. 20 is a section along the line XX—XX shown in FIG. 19.

The embodiment shown in FIGS. 19 and 20 corresponds in principle to that shown in FIG. 2 and differs therefrom in that the pipe member 25 is in this case a flexible hose open at the ends which end in a cylinder sealed by a diaphragm in the case of the transport gripper element 12a and displacing means 27.

In the case of the displacing means 27 its housing 60 contains a cylindrical chamber 61 divided by a diaphragm 62. The hydraulic medium in the pipe member 25 acts upon one side of the diaphragm, and the plunger 29 upon the other side. On the transport gripper 12a the housing 65 comprises a cylinder chamber 66 through which is guided a piston 68 which is integral with the gripper plate 67 and acts on a diaphragm 69 producing a seal between the cylinder chamber and the pressure medium. In this case also the gripper plate 67 is subjected to the pretensioning of the compression spring 23 which can be pretensioned by the set screw 24. The gripping action on the strip 6 is neutralized by the pressure medium which in turn is stored in an enclosed system without the risk of leakages.

Figure 21:
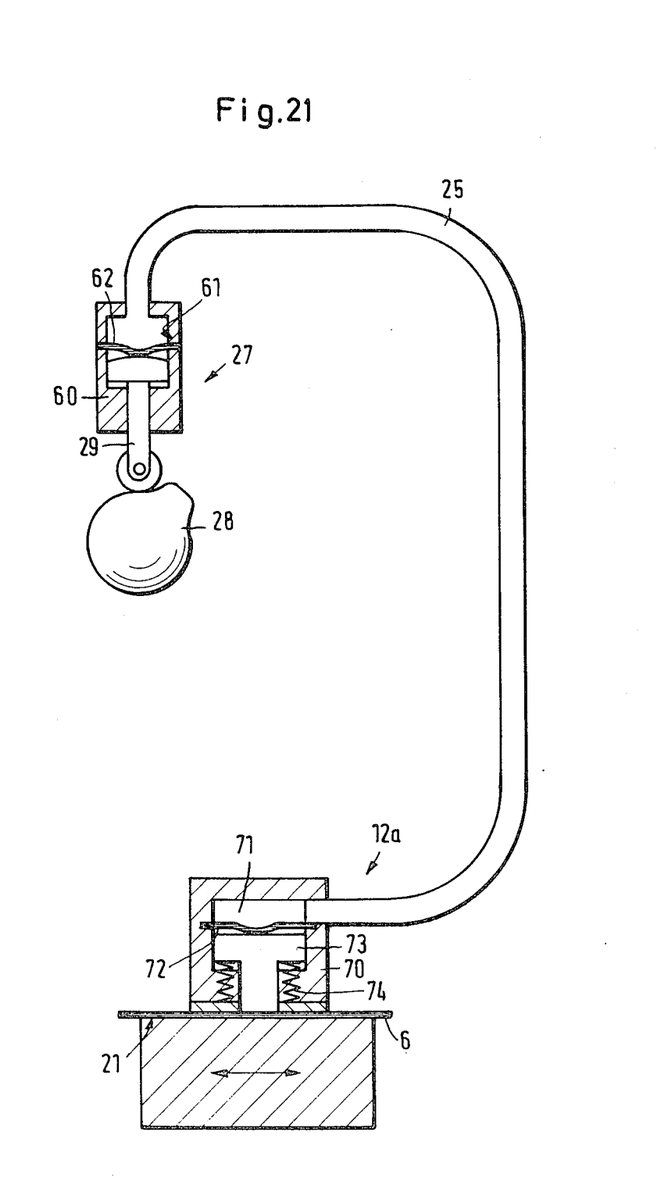
FIG. 21 is a further embodiment, corresponding to FIG. 7, of a gripping unit according to the invention with the associated displacing means.

FIG. 21 differs from FIG. 19 only in that it operates in the opposite way and in this respect corresponds to the embodiment shown in FIG. 7. The displacing means 27 is identical to that in FIG. 19. The associated transport gripper 12a again contains in the housing 70 a cylindrical chamber 71 divided by a diaphragm 72 which encloses the hydraulic medium and acts against a gripper plate 73 designed as a piston or plunger which can press the strip 6 against the surface 21 in opposition to the tension of the pretensioning spring 74.

Figures 22, 23:
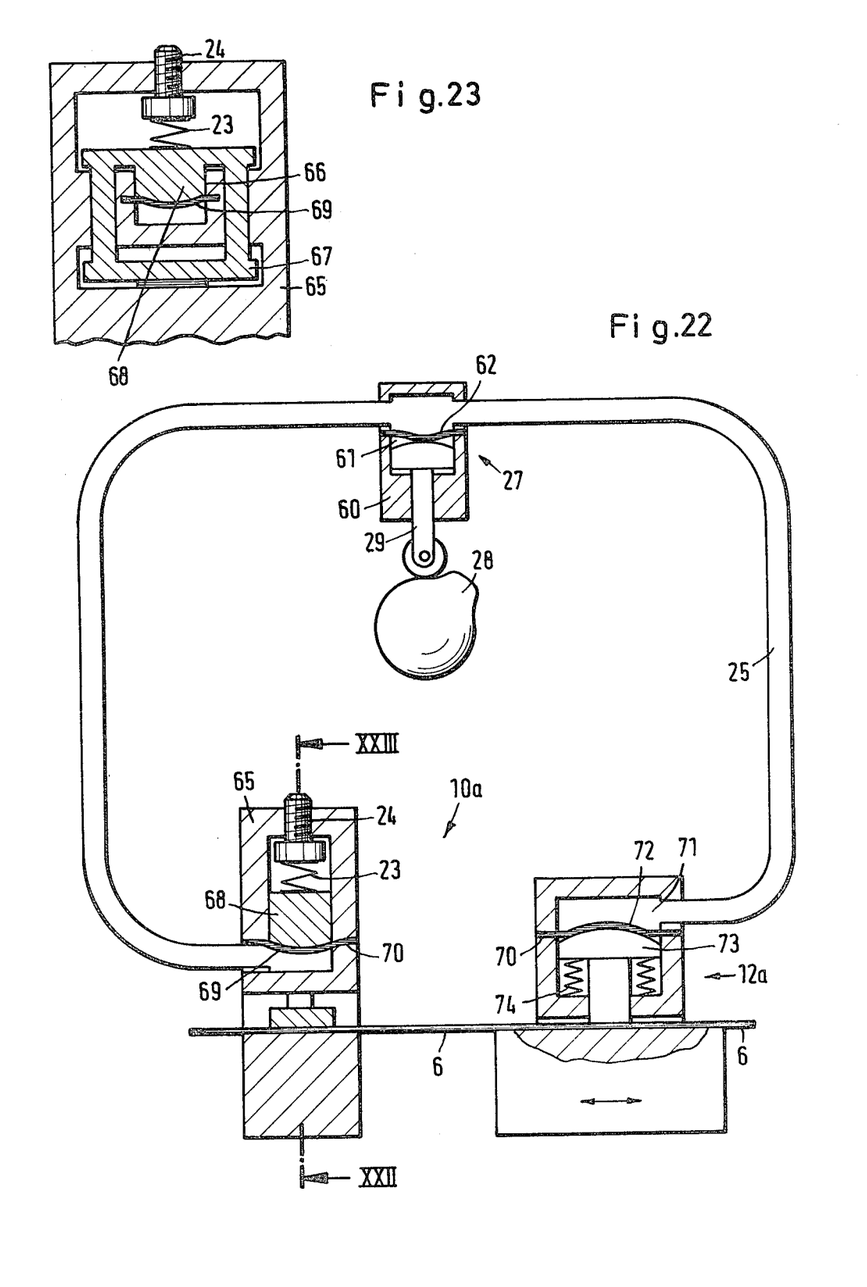
FIG. 22 is a view, corresponding to FIG. 11, of a further embodiment of a gripping unit according to the invention for the mutual operation of two gripping units.
FIG. 23 is a section along the line XXIII—XXIII shown in FIG. 22.

The embodiment shown in FIGS. 22 and 23 comprises, in accordance with FIG. 11, only one pipe member 25 which in this case is assisted by a displacing means 27 in applying pressure to the non-return gripper 10a and transport gripper 12a, the transport gripper 12a in this case corresponding to that shown in FIG. 21 and the non-return gripper 10a being identical to that shown in FIG. 19 so that one gripping element closes when the other opens.

Various modifications in structure and/or function may be made to the disclosed embodiments by one skilled in the art without departing from the scope of the invention as defined by the claims.

We claim:

1. A feed apparatus for feeding material to a metalworking machine comprising first and second alternately operating gripping means, the first gripping means comprising a reciprocating transport gripper element which moves the material forward by steps and the second gripping means comprising a stationary non-return gripper element which retains the material during the return stroke of the reciprocating transport gripper element, a closed container means for a non-circulating pressure medium, spring means responsive to the non-circulating pressure medium for applying a spring force to at least one of the gripper elements, means for displacing the pressure medium, the closed container means connected between the displacing means and the at least one gripper element, the closed container means having extensible wall sections, the wall sections being connected to the at least one gripper element and the displacing means.

2. A feed apparatus as claimed in claim 1 in which the container means is a conduit.

3. A feed apparatus as claimed in claim 1 or claim 2 in which a separate displacing means is provided for each gripper element and a separate container means is associated with each gripper element and its displacing means.

4. A feed apparatus as claimed in claim 1 or claim 2 in which the two gripper elements are associated with a common container means and common displacing means.

5. A feed apparatus as claimed in claim 3 in which the container means comprises a conduit with ends forming the extensible wall sections.

6. A feed apparatus as claimed in claim 4 in which the container means comprises a conduit with ends and a portion intermediate the ends forming the extensible wall sections.

7. A feed apparatus as claimed in claim 4 or claim 6 in which the gripping action on one gripping means is neutralized in opposition to spring tension and on the other gripping means can be applied in opposition to spring tension.

8. A feed apparatus as claimed in any of claims 2 or 4 in which the conduit is a flexible hose.

9. A feed apparatus as claimed in claim 1 in which each extensible wall section comprises a single or a repeatedly meandering extensible hose section.

10. A feed apparatus as claimed in claim 1 in which each extensible wall section comprises an extensible hose section which is like a cushion.

11. A feed apparatus as claimed in claim 1 in which the displacing means comprises a plunger, a cam for depressing the plunger and an adjustable back-stop, the extensible wall section being disposed between the plunger and the back-stop.

12. A feed apparatus as claimed in claim 1 in which the extensible wall sections in the at least one gripper element are clamped under the spring force between a gripper plate and a housing.

13. A feed apparatus as claimed in claim 12 including means for adjusting the spring force.

14. A feed apparatus according to claim 1 wherein the extensible wall sections are disposed at ends of the closed container means.

15. A feed apparatus according to claim 1 or claim 14 wherein at least one extensible wall section is disposed intermediate ends of the closed container means.

16. A feed apparatus according to claim 1 comprising a cylinder means connected to the closed container means wherein each extensible wall section comprises a diaphragm for sealing the cylinder means.

* * * * *